US008774856B2

(12) United States Patent
Kim et al.

(10) Patent No.: US 8,774,856 B2
(45) Date of Patent: Jul. 8, 2014

(54) MULTI-STANDBY PORTABLE TERMINAL (75) Inventors: Ji Hye Kim, Gyeonggi-do (KR); Jae Sung Shim, Gyeonggi-do (KR); Dong In Ha, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 474 days.

(21) Appl. No.: 12/568,721

(22) Filed: Sep. 29, 2009

(65) Prior Publication Data
US 2010/0087224 A1 Apr. 8, 2010

(30) Foreign Application Priority Data

Oct. 2, 2008 (KR) ........................ 10-2008-0096871

(51) Int. Cl.
*H04M 1/00* (2006.01)
(52) U.S. Cl.
USPC .......... 455/552.1; 455/443; 455/73; 370/311; 370/480; 375/347; 375/267
(58) Field of Classification Search
USPC ........ 370/311, 480, 252; 455/462, 78, 10, 83, 455/562.1, 575.1, 421, 552.1, 73, 272, 443, 455/69; 375/295, 347, 260, 267; 343/895, 343/702, 713, 745, 876, 828, 795
See application file for complete search history.

(56) References Cited

U.S. PATENT DOCUMENTS

| | | | | |
|---|---|---|---|---|
| 5,437,055 A | * | 7/1995 | Wheatley, III | 455/429 |
| 5,463,406 A | * | 10/1995 | Vannatta et al. | 343/725 |
| 5,987,037 A | * | 11/1999 | Gans | 370/480 |
| 5,990,838 A | * | 11/1999 | Burns et al. | 343/702 |
| 6,023,203 A | * | 2/2000 | Parish | 333/126 |
| 6,049,315 A | * | 4/2000 | Meyer | 343/895 |
| 6,140,966 A | | 10/2000 | Pankinaho | 343/700 MS |
| 2003/0234720 A1 | * | 12/2003 | MacNeille et al. | 340/435 |
| 2007/0105587 A1 | | 5/2007 | Lu | |
| 2007/0243832 A1 | | 10/2007 | Park et al. | |
| 2008/0106476 A1 | | 5/2008 | Tran et al. | |
| 2008/0182625 A1 | * | 7/2008 | Rofougaran | 455/562.1 |
| 2009/0291659 A1 | * | 11/2009 | Trachewsky | 455/272 |

FOREIGN PATENT DOCUMENTS

| | | |
|---|---|---|
| CN | 1395440 A | 2/2003 |
| CN | 1574675 A | 2/2005 |
| CN | 1615039 A | 5/2005 |
| CN | 1773877 A | 5/2006 |
| CN | 1925656 A | 3/2007 |
| EP | 1187353 A2 | 3/2002 |
| EP | 1691448 A1 | 8/2006 |
| EP | 1761076 A2 | 3/2007 |

(Continued)

*Primary Examiner* — Mahendra Patel
(74) *Attorney, Agent, or Firm* — Cha & Reiter, LLC (57) ABSTRACT

A multi-standby portable terminal reduces interference of the transmitting antenna by skewing electromagnetic waves of others antennas. The terminal includes: a plurality of communication modules for transmitting and receiving RF signals of different frequency bands to and from the plurality of RF communication networks; and a controller for controlling the plurality of communication modules so as to be coupled to an RF communication network selected by a user, via a communication module corresponding to the selected RF communication network. The controller performs a control operation such that the communication module corresponding to the selected RF communication network radiates electromagnetic waves corresponding to a frequency band of the selected RF communication network, and remaining communication modules radiate electromagnetic waves of frequency bands that differ from those of respective corresponding RF communication networks.

6 Claims, 9 Drawing Sheets

(56) References Cited

FOREIGN PATENT DOCUMENTS

| | | | | |
|---|---|---|---|---|
| JP | 2003-188759 | 7/2003 | ............... | H04B 1/40 |
| JP | 2004-096303 | 3/2004 | ............... | H04B 1/40 |
| KR | 2006-83465 | 7/2006 | ............... | H04B 1/44 |

* cited by examiner

MULTI-STANDBY PORTABLE TERMINAL

CLAIM OF PRIORITY

This application claims priority from an application entitled "MULTI-STANDBY PORTABLE TERMINAL" filed in the Korean Intellectual Property Office on Oct. 2, 2008 and assigned Serial No. 10-2008-0096871, the contents of which are incorporated herein by reference in its entirety.

BACKGROUND OF THE INVENTION

1. Field of the Invention

The present invention relates to portable terminals, and more particularly, to a multi-standby portable terminal that can receive different radio frequency (RF) signals from a plurality of RF communication networks.

2. Description of the Related Art

In general, portable terminals typically refer to electronic devices that allow users to freely enjoy wireless communication, which may comprise, for example, radio frequency (RF) communication, network access, digital broadcast reception, etc. As portable terminals are very popular and widely used, manufacturers have developed these terminals so as to provide a variety of functions.

In recent years, multi-mode portable terminals have been released on the market, which can use two or more RF communication networks. The multi-mode portable terminals can perform RF communication within at least two or more RF communication network service areas. For example, dual mode portable terminals can support a Code Division Multiple Access (CDMA) network and a Global System for Mobile communication (GSM) network, so that they can perform communication within both CDMA and GSM network service areas. The multi-mode portable terminals are, however, disadvantageous in that, since as they switch among communication networks in such a way that they are booted, enter an idle mode, and then perform a switching operation by operating a menu prior to the actual switch. In addition, the switching process of these terminals is often complicated to operate and require a lot of time to switch their modes.

In order to resolve these problems in the multi-mode portable terminals, a conventional multi-standby portable terminal has been proposed to attempt to address some of these problems. For example, unlike the dual-mode portable terminals described above, a dual standby portable terminal can simultaneously support two networks, for example, a CDMA network and a GSM network. This conventional dual standby portable terminal periodically requests and receives a preamble and/or pilot channel signal from base stations for both CDMA and GSM communication networks, respectively, even during the idle mode, and measures the channel states, such as RSSI, CINR, SoQ, etc., so that it can simultaneously support two communication networks.

The conventional multi-standby portable terminal includes a plurality of different antennas in its single body to be able to transmit and receive at the various frequencies assigned to the different wireless protocols. However, the conventional multi-standby portable terminal suffers from the fact that it cannot completely isolate one antenna from among the different antennas, so these antennas interfere with each other, and thus the communication performance of the portable terminal is deteriorated.

Therefore, there is a long-felt need in the art to provide a new multi-standby portable terminal that minimizes interference among antennas installed therein and to accordingly optimize their communication performance.

SUMMARY OF THE INVENTION

The present invention provides a multi-standby portable terminal that can optimize the performance of respective antennas that receive different radio frequency (RF) signals from a plurality of RF communication networks.

It will be appreciated by persons of ordinary skill in the art that the objects of the present invention are not limited by the foregoing description, but become more apparent to the artisan in view of the following detailed description.

In accordance with an exemplary embodiment of the present invention, the present invention provides a multi-standby portable terminal that is preferably coupled to a plurality of radio frequency (RF) communication networks, including: a plurality of communication modules for transmitting and receiving RF signals of different frequency bands to and from a plurality of RF communication networks; and a controller for controlling the plurality of communication modules so as to be coupled to an RF communication network selected by a user, via a communication module corresponding to the selected RF communication network. In one exemplary aspect, the controller performs a control operation such that the communication module corresponding to the selected RF communication network radiates electromagnetic waves corresponding to a frequency band of the selected RF communication network, and remaining communication modules, other than the communication module corresponding to the selected RF communication network, radiate electromagnetic waves of frequency bands that differ from those of respective corresponding RF communication networks.

In accordance with another exemplary aspect of the present invention, the present invention provides a multi-standby portable terminal that can be coupled to a plurality of radio frequency (RF) communication networks, including: a plurality of communication modules for transmitting and receiving RF signals of different frequency bands to and from the plurality of RF communication networks; and a controller for controlling the plurality of communication modules so as to be coupled to an RF communication network selected by a user, via a communication module corresponding to the selected RF communication network. The controller preferably performs a control operation such that the communication module corresponding to the selected RF communication network performs an impedance match with a frequency band of the selected RF communication network, and the remaining communication modules, other than the communication module corresponding to the selected RF communication network, which do not perform an impedance match with frequency bands of respective corresponding RF communication networks.

BRIEF DESCRIPTION OF THE DRAWINGS

The exemplary features and advantages of the present invention will become more apparent from the following detailed description in conjunction with the accompanying drawings, in which.

BRIEF DESCRIPTION OF CERTAIN SYMBOLS IN THE DRAWINGS

1: portable terminal
11: first RF communication network
12: second RF communication network
100: first communication module
110: first antenna part
120: first switching part
200: second communication module
210: second antenna part
220: second switching part
300: controller
400: first communication module
410: first antenna part
420: first switching part
430: first impedance matching part
500: second communication module
510: second antenna part
520: second switching part
530: second impedance matching part
600: controller

DETAILED DESCRIPTION

In the following description, exemplary embodiments of the present invention are described in detail with reference to the accompanying drawings so that those skilled in the art can easily implement this invention.

Detailed descriptions of well-known functions and structures incorporated herein may be omitted to avoid obscuring appreciation of the subject matter of the present invention by the artisan.

Although the drawings represent an exemplary embodiment of the invention, the drawings are not necessarily to scale and certain features may be exaggerated or omitted in order to better illustrate and explain certain aspects of the present invention. The same reference numbers are used throughout the drawings to refer to the same or similar parts.

Hereinafter, exemplary embodiments of the present invention are described in detail with reference to the accompanying drawings.

Figure 1:
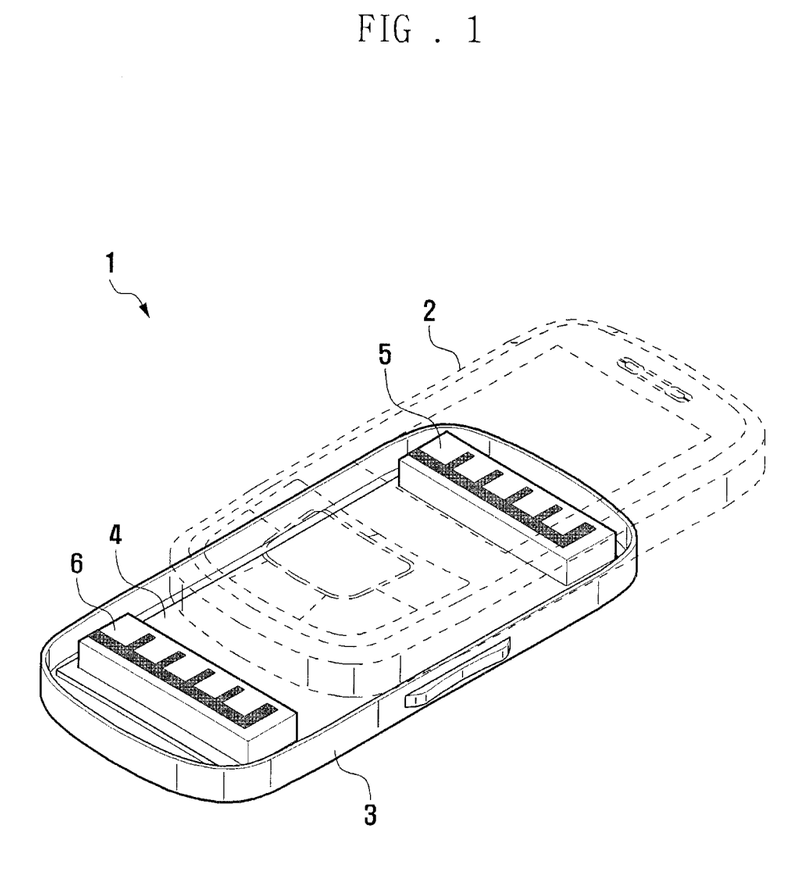
FIG. 1 is a perspective view illustrating an exemplary multi-standby portable device according to an exemplary aspect of the present invention.

FIG. 1 is a perspective view illustrating an exemplary multi-standby portable device according to the present invention.

As shown in FIG. 1, the multi-standby portable terminal 1 includes a body having an upper case 2 and a lower case 3, a main printed circuit board (PCB) 4, and at least two or more antenna parts 5 and 6 that may be arranged thereon.

In an exemplary embodiment of the present invention, although the multi-standby portable terminal 1 comprises a slide type, it should be understood by a person of ordinary skill in the art that the present invention is not limited to the examples shown and described herein. Instead, it will be appreciated that the present invention can be applied to, for example, bar type portable terminals, flip types, folder types, rotation types, etc., just to name some possible terminal types. Since the multi-standby portable terminal 1 is a slide type, its body is configured to include the upper case 2 and the lower case 3, so that they can relatively slide and move toward each other.

The main PCB 4 includes a variety of electric parts and wires on a thin plate board. The main PCB 4 is installed in the body. It is preferable in this example that the main PCB 4 is installed in a space of the lower case 3.

In an exemplary embodiment of the present invention, as shown in FIG. 1, the multi-standby portable terminal 1 is implemented with two antenna parts 5, 6. The two antenna parts 5, 6 serve to communicate radio frequency (RF) signals of different frequency bands with a plurality of RF communication networks. The two antenna parts 5, 6 may be installed in the body, electrically connecting to the main PCB 4. As shown in FIG. 1, the two antenna parts 5, 6 can be each installed on the upper and lower portions of the lower case 3. It should be understood that the installation location of the antenna parts are not limited to the exemplary embodiments of the present invention shown and described herein. The antenna parts 5, 6 can be implemented with a whip antenna, a helical antenna, a combination of thereof, etc., just to name some antenna structures for use herein.

Exemplary Embodiment 1

Figure 2:
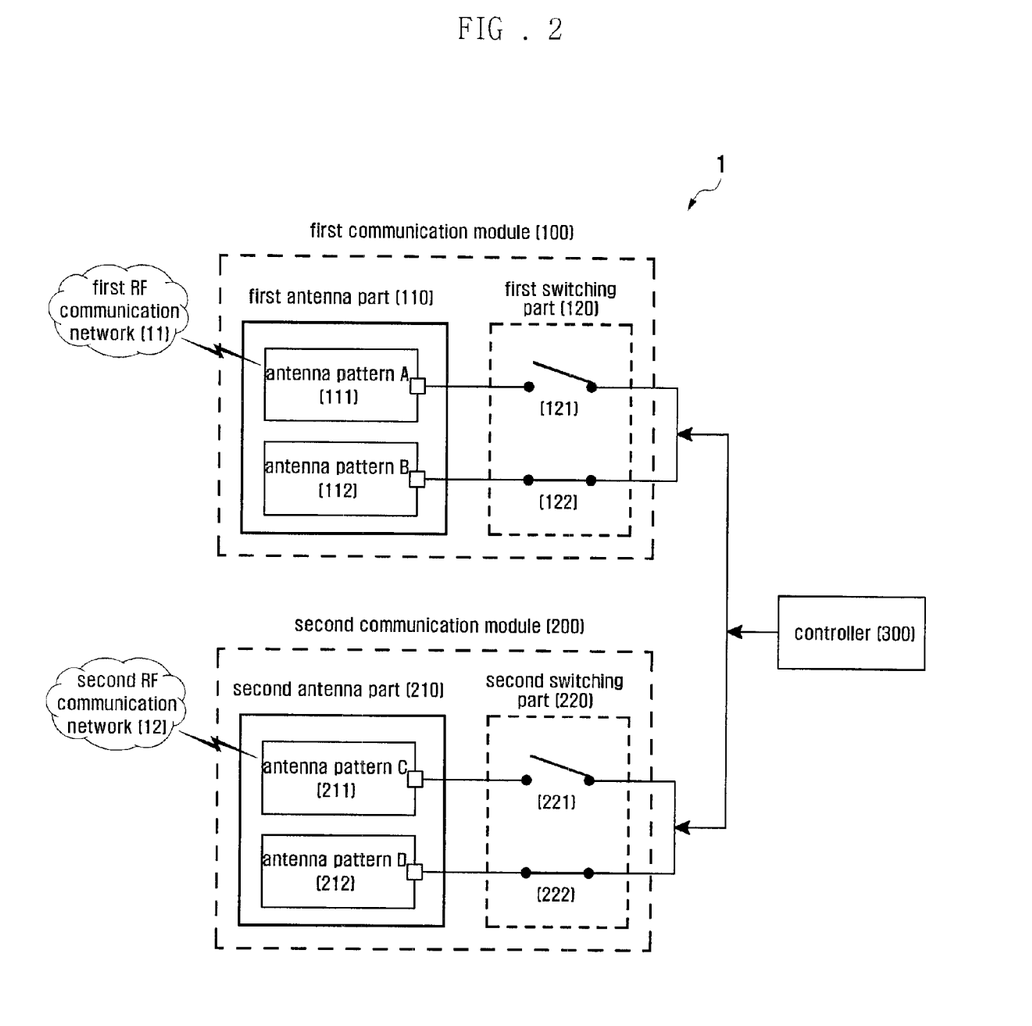
FIG. 2 is a schematic block diagram illustrating a multi-standby portable terminal according to a first exemplary embodiment of the present invention.

FIG. 2 is a schematic block diagram illustrating a multi-standby portable terminal 1 according to a first exemplary embodiment of the present invention.

As shown in FIG. 2, the exemplary multi-standby portable terminal 1 includes a plurality of communication modules, coupled to a plurality of RF communication networks, and a controller 300. In an embodiment of the present invention, the multi-standby portable terminal is explained based on two communication modules 100 and 200 and two RF communication networks 11 and 12 in order to clearly describe the present invention. It should be understood that the present invention is not limited by the numbers of the communication modules and the RF communication networks shown and described herein.

The communication modules 100 and 200 communicate RF signals of different frequency bands with the RF communication networks 11 and 12 and process them. The RF communication networks 11 and 12 provide RF communication services using different frequency bands. For example, for explanatory purposes of this example, a first RF communication network 11 uses a CDMA RF signal in a frequency band of 900 MHz, and a second RF communication network 12 uses a PCS RF signal in a frequency band of 1900 MHz. The concept of the RF communication networks 11, 12 may include RF communication service providers who provide RF communication services using different frequency bands allocated thereto, respectively.

As shown in FIG. 2, the communication modules 100, 200 include respective first and second antenna parts 110, 210 and respective first and second switching parts 120, 220.

The term "antenna part" refers to a device that radiates electromagnetic waves to transmit and receive RF signals to and from the RF communication network. The antenna part is designed to have a resonant frequency in a frequency band of a RF communication network. The antenna part is formed on an antenna carrier (not shown), with an antenna pattern, considering the design of a portable terminal and user convenience. The antenna pattern can be formed on the body of the portable terminal. The shape of the antenna pattern can be determined according to the radiation performance and the available inner space of the portable terminal.

As shown in FIG. 2, in the multi-standby portable terminal 1 according to a first exemplary embodiment, the antenna parts 110, 210 includes first antenna patterns 111, 211, radiating electromagnetic waves in corresponding respective frequency bands of the RF communication networks 11, 12, and the second antenna patterns 112, 212 are formed separately from the first antenna patterns 111, 211. The first antenna patterns 111, 211, in this example are formed to have patterns tuned to be operated in the frequency bands of the RF communication networks, respectively. The second antenna patterns 112, 212 may be formed to have arbitrary patterns that use frequency bands differing from those of the first antenna patterns 111, 211 for improved transmission and reception, unlike the conventional art. That is, the first antenna patterns 111, 211 are used to perform RF communication with the RF communication networks. On the contrary, the second antenna patterns 112, 212 are used to reduce interference between different antenna parts. For example, while the multi-standby portable terminal is performing RF communication using a particular antenna part, the second antenna patterns 112 and 212 of the other antenna part skew electromagnetic waves of the first antenna patterns 111 and 211 to enhance the performance of the particular antenna part. In an exemplary embodiment of the present invention, as shown in FIG. 2, the first communication module 100 includes an antenna pattern A (111), as a first antenna pattern, and an antenna pattern B (112) as a second antenna pattern. Similarly, the second communication module 200 includes an antenna pattern C (211), as a first antenna pattern, and an antenna pattern D (212) as a second antenna pattern.

Still referring to FIG. 2, the switching parts 120, 220 selectively operate the first antenna patterns 111, 211 and the second antenna patterns 112, 212, respectively. The switching parts 120, 220 may further include switching units that are coupled to the first antenna patterns 111, 211 and the second antenna patterns 112, 212, respectively. It will be appreciated that the switching parts 120, 220 can be implemented by any type of switching unit capable of selectively switching the first antenna patterns 111, 211 and the second antenna patterns 112, 212, respectively. In an exemplary embodiment of the present invention, the switching units are implemented with a relay or relays. An artisan should understand can appreciate there are many other types of switching units that could be used.

Although it is not shown in the above exemplary embodiment of the present invention, each of the communication modules 100 and 200 may further include a signal processor for RF signals and a matching part for matching impedance between each of the antenna parts 110, 210 and the signal processor.

The controller 300 controls the communication modules 100, 200 to be coupled to an RF communication network, via a communication module, according to a user's selection.

In a first exemplary embodiment of the present invention, the controller 300 performs a control operation in such a way that a communication module corresponding to a selected RF communication network can radiate electromagnetic waves in a frequency band of the selected RF communication network and remaining communication modules, other than the communication module corresponding to the selected RF communication network, can radiate electromagnetic waves of frequency bands that differ from those of respective corresponding RF communication networks, respectively.

For example, the controller 300 can drive the first antenna patterns 111, 211 of a corresponding communication module corresponding to a selected RF communication network so that the corresponding communication module can radiate electromagnetic waves corresponding to a frequency band of the selected RF communication network. It is preferable that the controller 300 controls the switching parts 120, 220 corresponding to the selected RF communication network to drive the first antenna patterns 111, 211 in a communication module corresponding to the selected RF communication network, and also stops the operation of the second antenna patterns 112, 212 in a communication module corresponding to the selected RF communication network, thereby radiating electromagnetic waves corresponding to a frequency band that corresponds to the selected RF communication network.

In addition, the controller 300 selectively drives the combination of the first antenna patterns 111, 211 and the second antenna patterns 112, 212 in the remaining communication modules, other than a communication module corresponding to a selected RF communication network, so that the remaining communication modules can radiate electromagnetic waves of frequency bands that differ from those of respective corresponding RF communication networks and reduce interference.

It is also preferable that the controller 300 controls the switching parts 120, 220 in remaining communication modules, other than a communication module corresponding to a selected RF communication network and thus drives all of the first antenna patterns 111, 211 and the second antenna patterns 112, 212 in the remaining communication modules, so that the remaining communication modules can radiate electromagnetic waves of frequency bands that differ from those of respective corresponding RF communication networks. The controller 300 can also control the switching parts 120, 220 in remaining communication modules, other than a communication module corresponding to a selected RF communication network and thus stops driving the first antenna patterns 111, 211 in the remaining communication modules, so that the remaining communication modules can radiate electromagnetic waves of frequency bands that differ from those of respective corresponding RF communication networks.

Still referring to FIG. 2, in the first exemplary embodiment of the present invention, the multi-standby portable terminal 1 is explained, including two communication modules. That is, the first communication module 100 is coupled to the first RF communication network 11 and transmits and receives RF signals thereto and therefrom. Similarly, the second communication module 200 is coupled to the second communication network 12 and transmits and receives RF signals thereto and therefrom.

The first communication module 100 preferably includes the first antenna part 110, having antenna pattern A (111) and antenna pattern B (112), and the first switching part 120 for selectively switching the antenna pattern A (111) or antenna pattern B (112). The antenna pattern A (111) radiates electromagnetic waves in a frequency band of the first RF communication network 11 in order to transmit and receive RF signals to and from the first RF communication network 11. The antenna pattern B (112) serves to skew electromagnetic waves of the antenna pattern A (111).

The second communication module 200 includes the second antenna part 210, having antenna pattern C (211) and antenna pattern D (212), and the second switching part 220 for selectively switching the antenna pattern C (211) or antenna pattern D (212). The antenna pattern C (211) radiates electromagnetic waves in a frequency band of the second RF communication network 12 in order to transmit and receive RF signals to and from the second RF communication network 12. The antenna pattern D (212) serves to skew electromagnetic waves of the antenna pattern C (211) when the first antenna pattern A is communicating with network 11. The controller 300 controls the first switching part 120 of the first communication module 100 and the second switching part 220 of the second communication module 200 so as to radiate electromagnetic waves in frequency bands of the first RF communication network 11 or the second RF communication network 12.

As described above, the multi-standby portable terminal, according to a first exemplary embodiment of the present invention, selectively drives first and second antenna patterns formed in the antenna parts of the plurality of communication modules in order to optimize the performance of the antenna parts that are communicating.

In the following description, the operation of the multi-standby portable terminal, according to the first exemplary embodiment of the present invention, is described in detail with reference to the drawings.

Figure 3A:
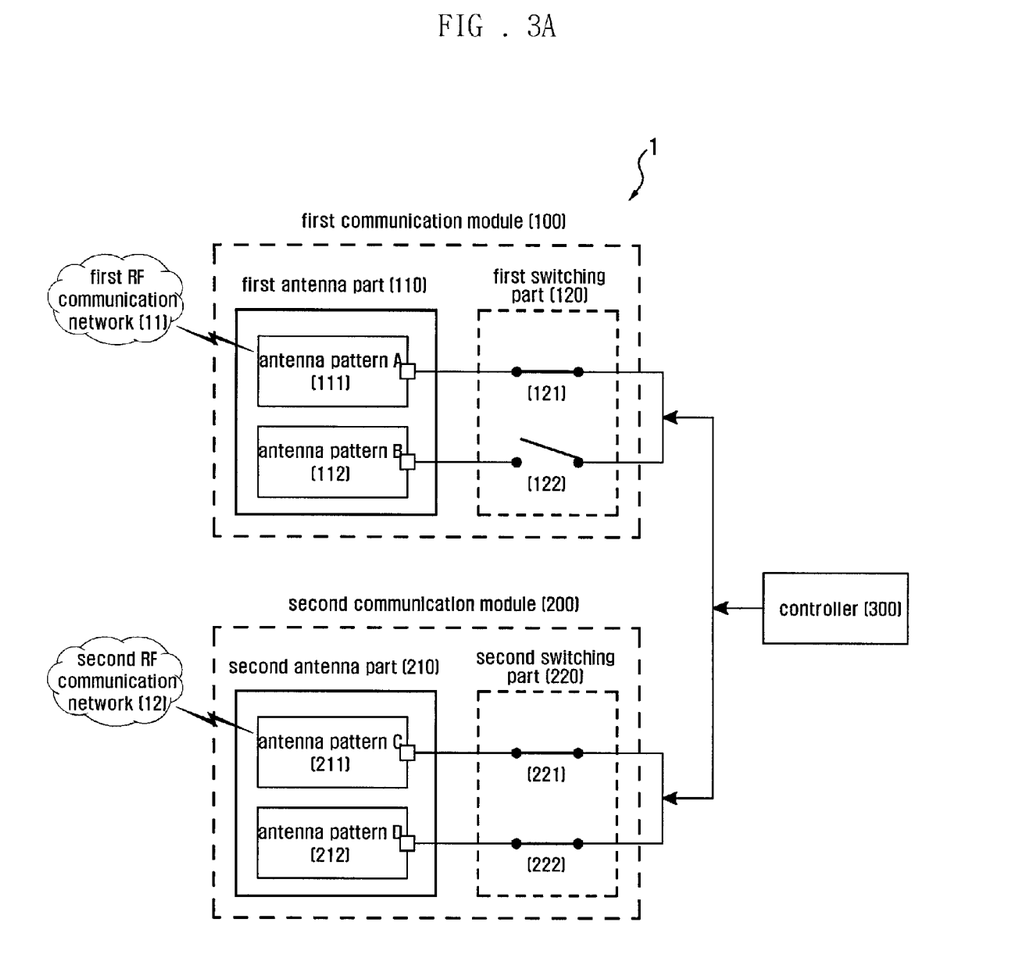
FIG. 3A and FIG. 3B are schematic block diagrams illustrating operations when the multi-standby portable terminal of the first exemplary embodiment of the present invention accesses a first RF communication network.
Figure 3B:
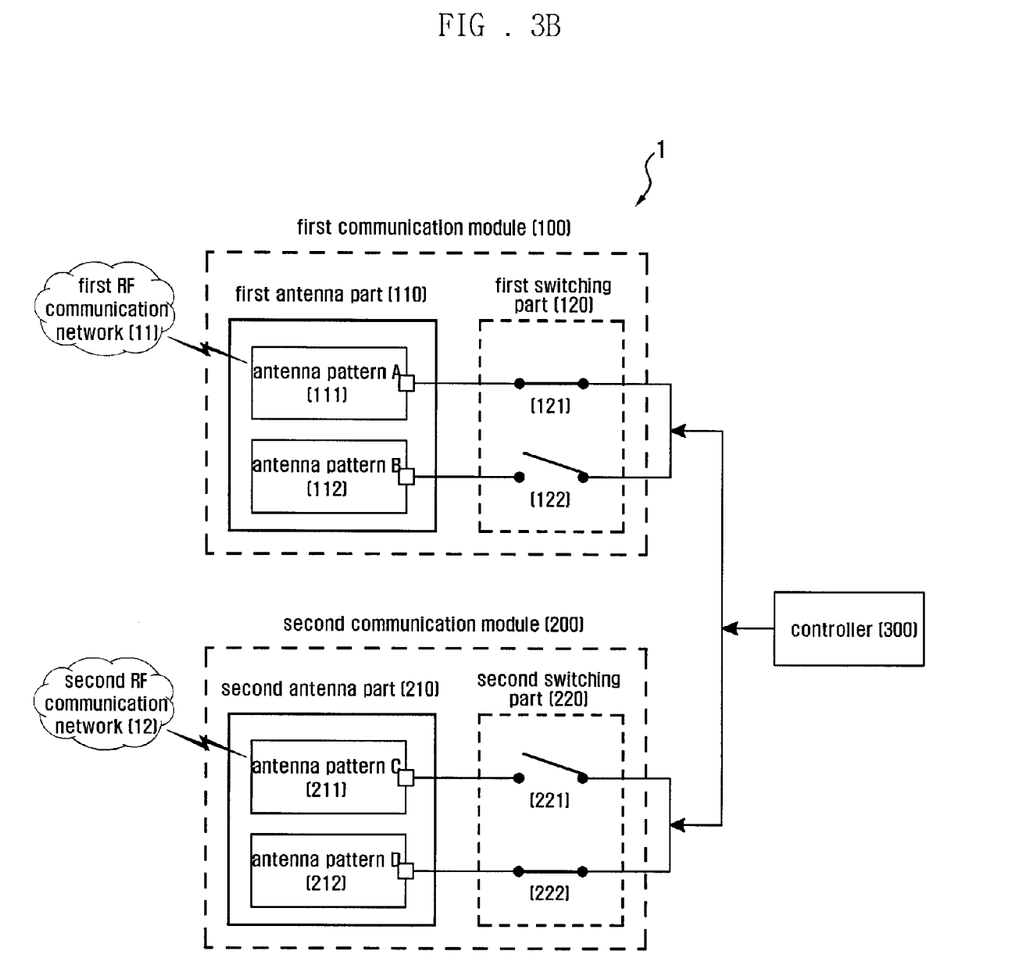

FIG. 3A and FIG. 3B are schematic block diagrams illustrating operations when the multi-standby portable terminal of the first embodiment of the present invention accesses a first RF communication network.

As shown in FIGS. 3A and 3B, the multi-standby portable terminal 1 can communicate with the first RF communication network 11 as the controller 300 controls the first switching part 120 of the first communication module 100 so that the first switching part 120 closes the switching unit 121 coupled to the antenna pattern A (111) and opens the switching unit 122 coupled to the antenna pattern B (112).

The controller 300 can also control the second switching part 220 of the second communication module 200 to be selectively coupled to the antenna pattern C (211) or the antenna pattern D (212). As shown in FIG. 3A, when the switching part 220 closes the switching unit 221 coupled to the antenna pattern C (211), it can also close the switching unit 222 coupled to the antenna pattern D (212) in order to skew electromagnetic waves of the antenna pattern C (211). In addition, as shown in FIG. 3B, when the switching part 220 opens the switching unit 221 coupled to the antenna pattern C (211), it must close the switching unit 222 coupled to the antenna pattern D (212) because the second antenna part 210 must also remain in an idle mode.

As described above, the controller 300 controls the switching part to be coupled to the antenna pattern A (111) of the first communication module 100 communicating with the first RF communication network 11 and thus optimizes the performance of the first antenna part 110. The controller 300 also controls the switching part to be selectively coupled to the antenna pattern C (211) or the antenna pattern D (212) of the second communication module 200 and thus skews the performance of the second antenna part 210. Therefore, interference between the first antenna part 110 and the second antenna part 210 can be minimized. "Skewing the performance" of the second antenna part 210 in this application means to slightly reduce the radiation performance of the second antenna part 210. Consequently, the first antenna part 110 communicating with the first RF communication network 11 can exert an optimal radiation performance.

Figure 4:
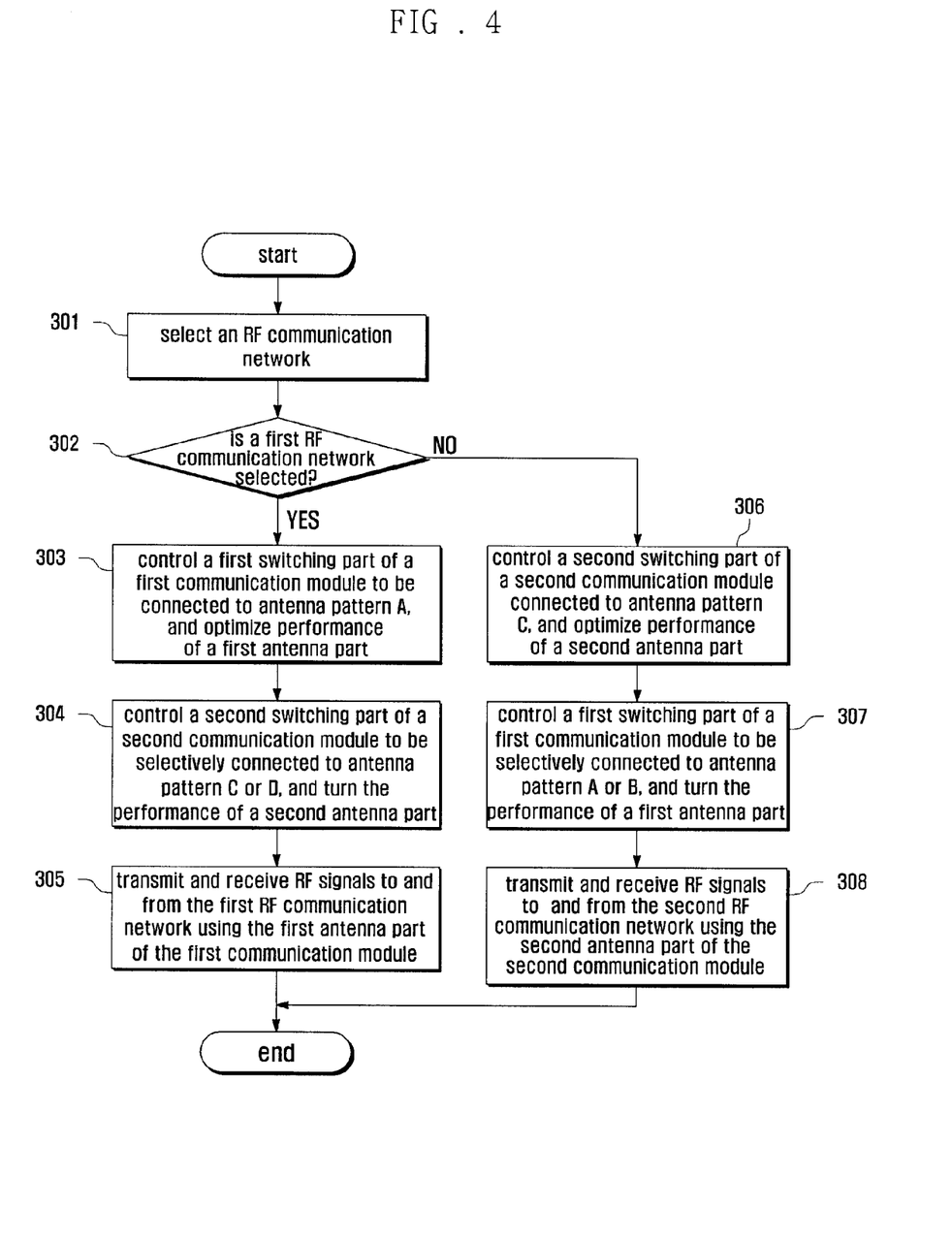
FIG. 4 is a flow chart illustrating operations of the multi-standby portable terminal according to the first exemplary embodiment of the present invention.

FIG. 4 is a flow chart illustrating operations of the multi-standby portable terminal according to the first exemplary embodiment of the present invention.

When a user performs a selection of an RF communication network (301), the controller 300 determines whether a first RF communication network 11 or a second RF communication network 12 has been selected (302).

If the controller 300 ascertains that a first RF communication network 11 has been selected at 302, it controls the first switching part 120 of the first communication module 100 to be coupled to the antenna pattern A (111) and thus optimizes the performance of the first antenna part 110 (303).

The controller 300 also controls the second switching part 220 of the second communication module 200 to be selectively coupled to the antenna pattern C (211) or the antenna pattern D (212) and thus skews the performance of the second antenna part 210 (304). After that, the controller 300 can communicate RF signals with the first RF communication network 11 via the first antenna part 110 of the first communication module 100 (305).

On the contrary, if the controller 300 ascertains that a second RF communication network 12 has been selected at 302, it controls the second switching part 220 of the second communication module 200 to be coupled to the antenna pattern C (211) and thus optimizes the performance of the second antenna part 210 (306). The controller 300 also controls the first switching part 120 of the first communication module 100 to be selectively coupled to the antenna pattern A (111) or the antenna pattern B (112) and thus skews the performance of the first antenna part 110 (307). After that, the controller 300 can communicate RF signals with the second RF communication network 12 via the second antenna part 210 of the second communication module 200 (308).

As described above, the multi-standby portable terminal, according to the first exemplary embodiment of the present invention, can switch antenna patterns according to a frequency band of an RF communication network that is performing communication, thereby optimizing the performance of the antenna part that is performing communication.

Exemplary Embodiment 2

Figure 5:
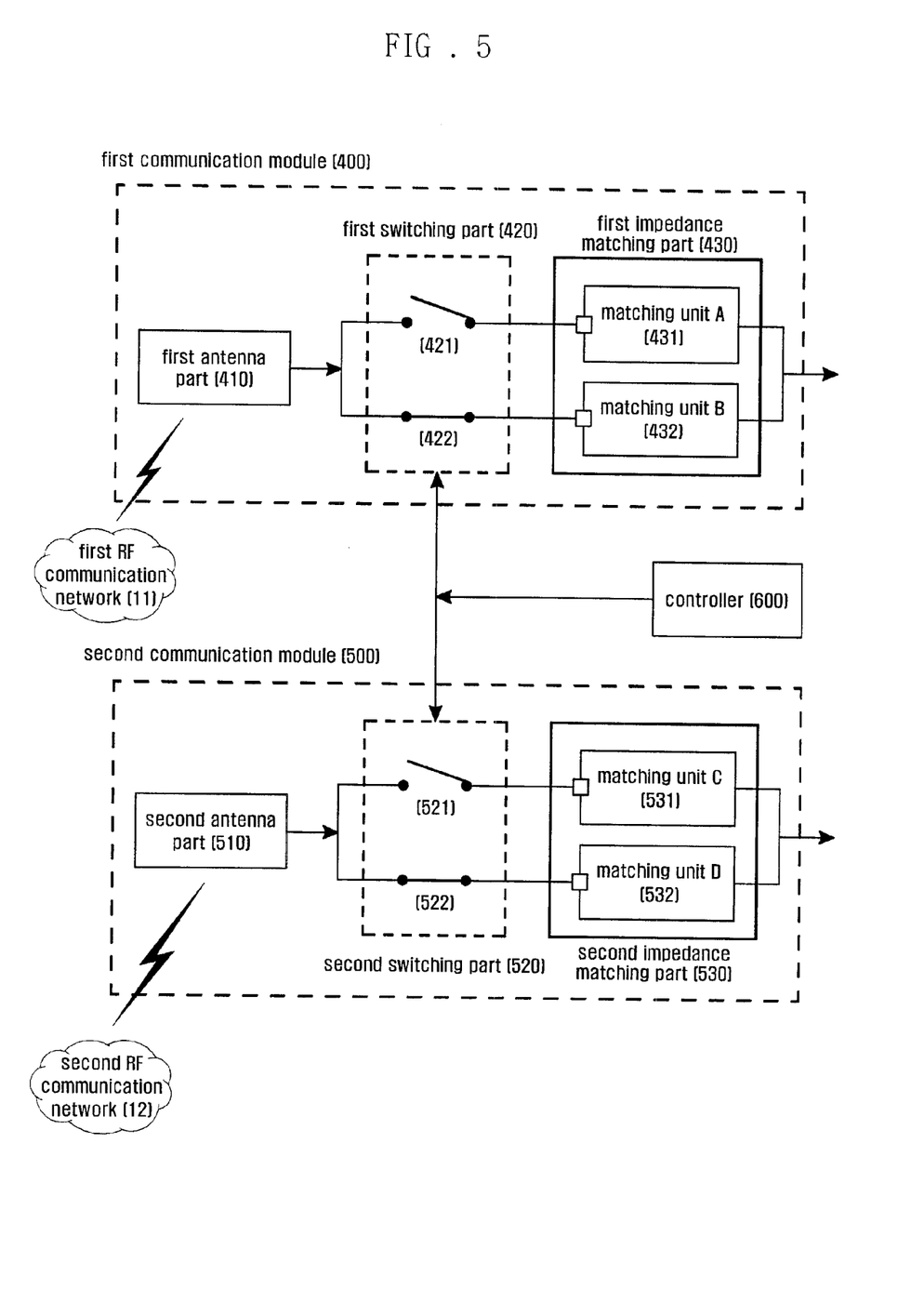
FIG. 5 is a schematic block diagram illustrating a multi-standby portable terminal according to a second exemplary embodiment of the present invention.
Figure 6A:
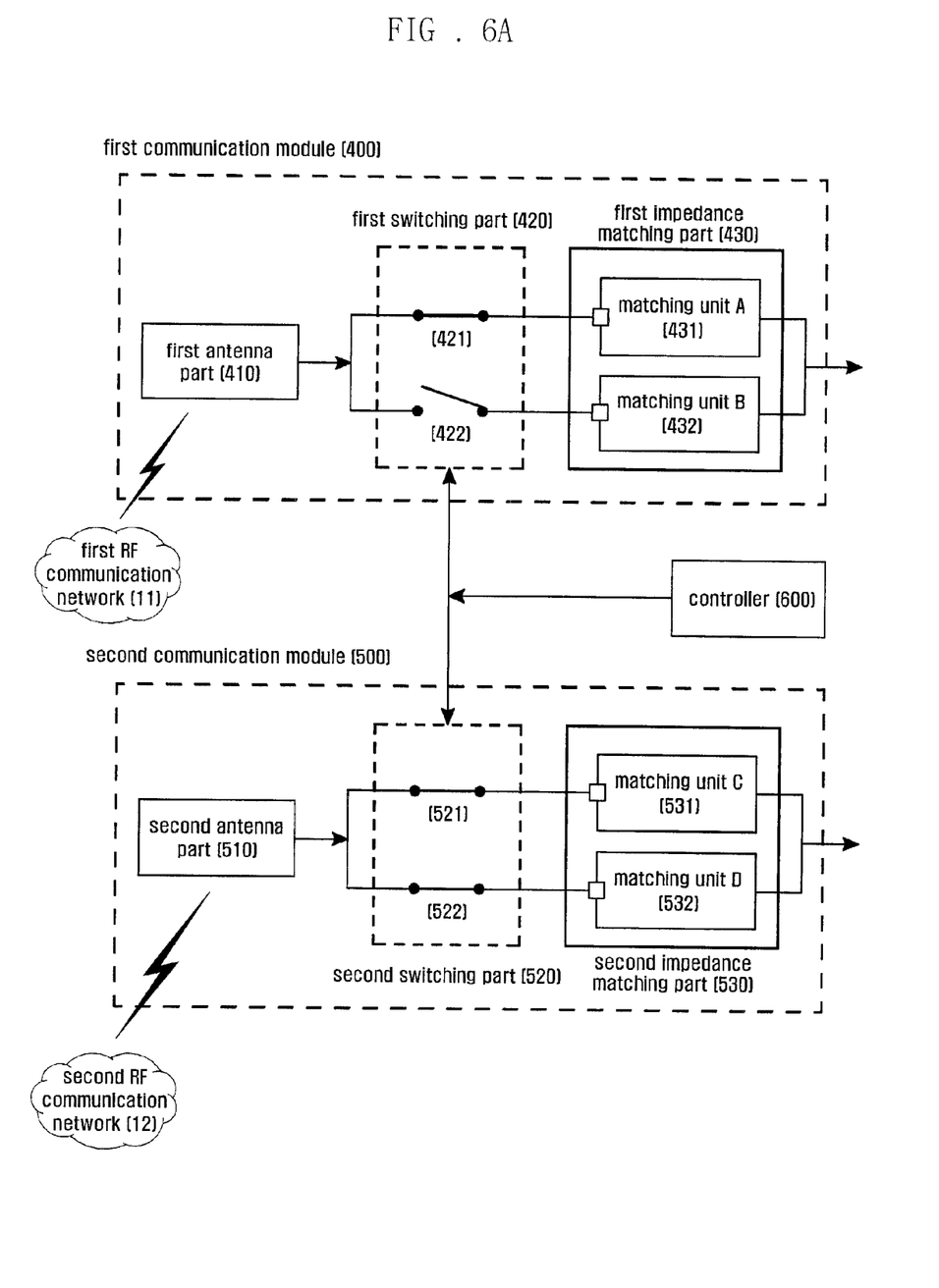
FIG. 6A and FIG. 6B are schematic block diagrams illustrating operations when the multi-standby portable terminal of the second exemplary embodiment of the present invention accesses a first RF communication network.
Figure 6B:
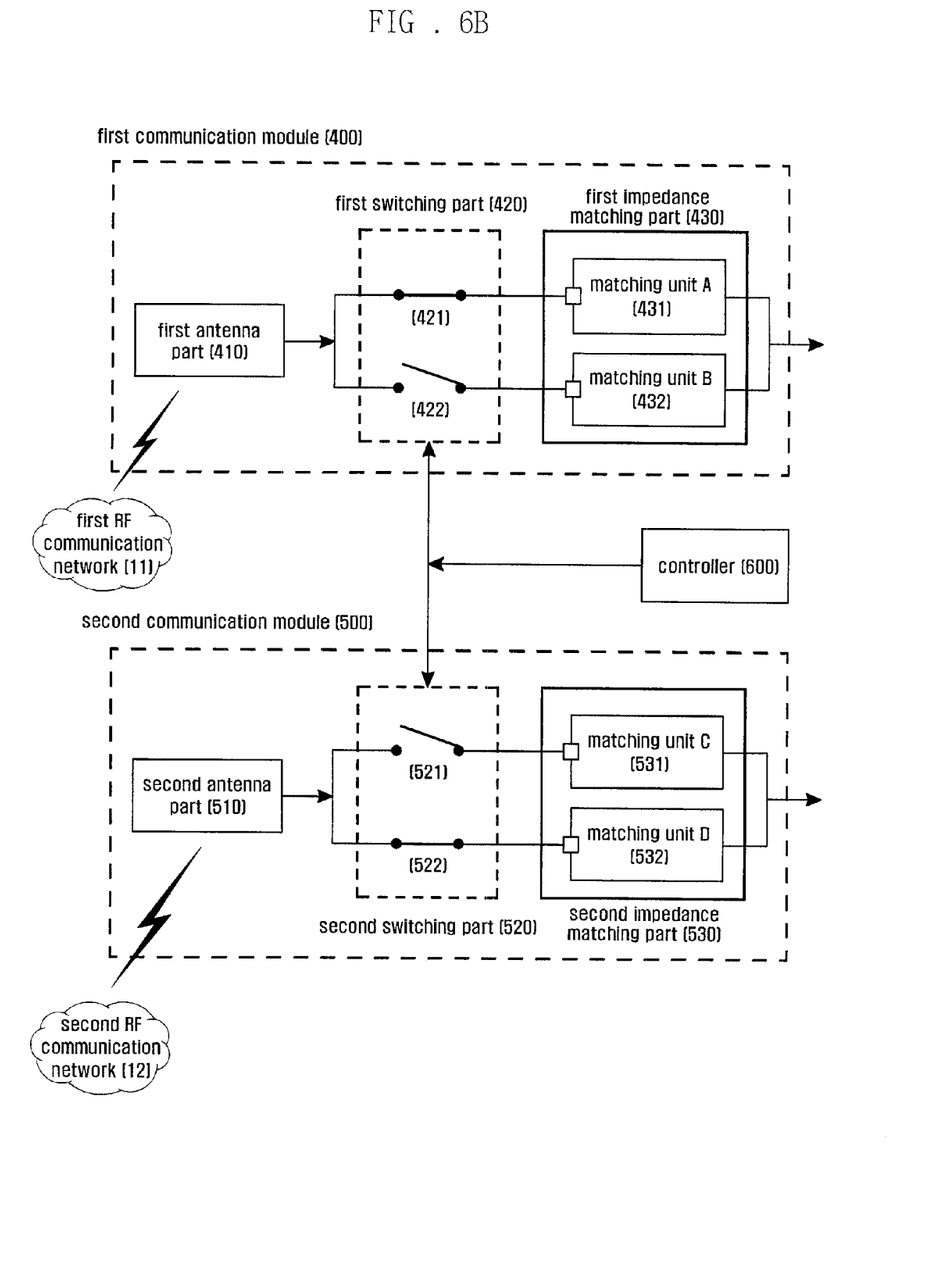
Figure 7:
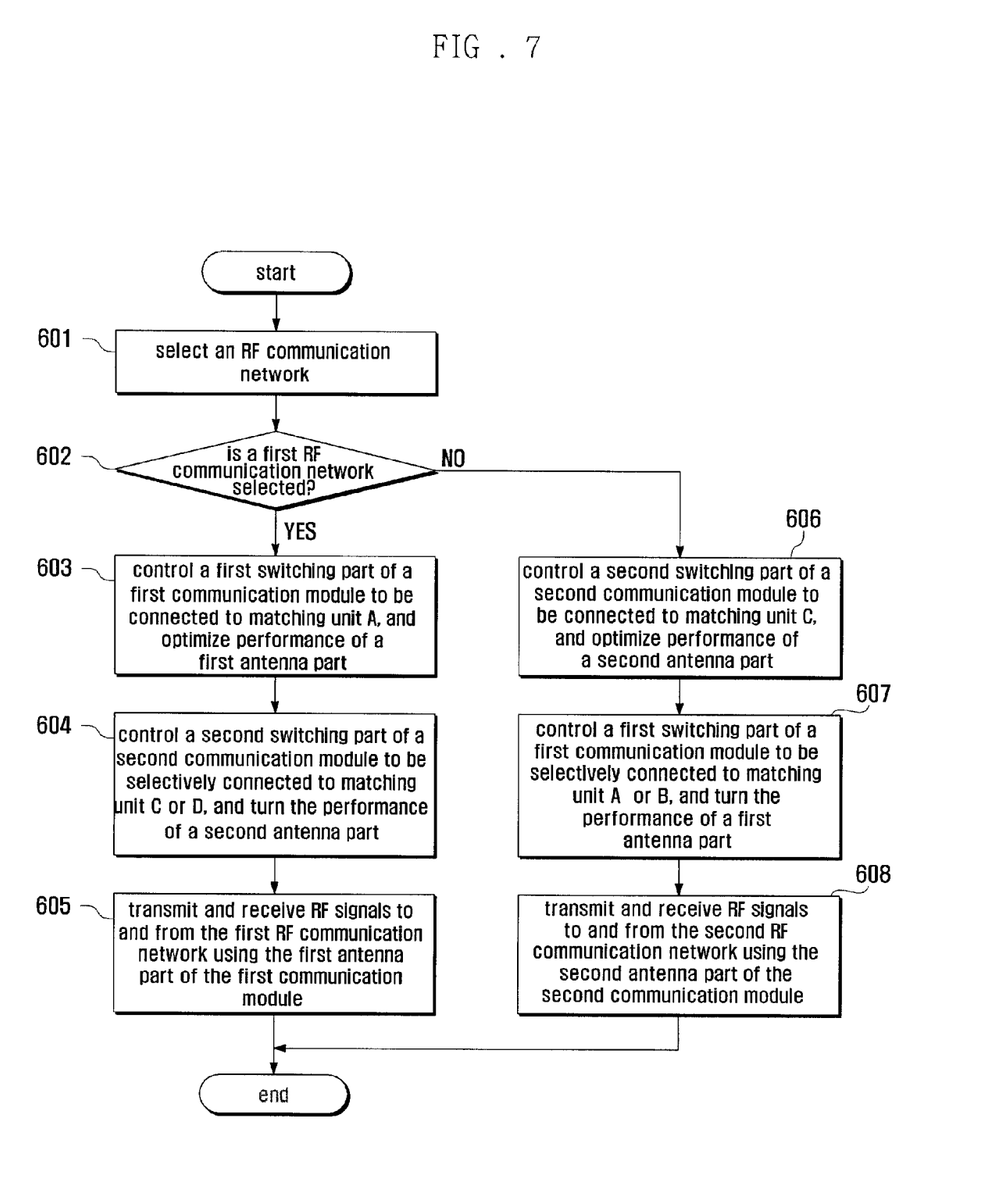
FIG. 7 is a flow chart illustrating operations of the multi-standby portable terminal according to the second exemplary embodiment of the present invention.

Referring now to FIGS. 5 through 7, a multi-standby portable terminal 1 according to a second exemplary embodiment of the present invention is explained in detail.

FIG. 5 is a schematic block diagram illustrating a multi-standby portable terminal according to a second exemplary embodiment of the present invention.

As shown in FIG. 5, the multi-standby portable terminal 1 includes a plurality of communication modules, coupled to a plurality of RF communication networks, and a controller 600. In this particular exemplary embodiment of the present invention, the multi-standby portable terminal is described as having two communication modules 400 and 500 and two RF communication networks 11 and 12 in order to simply describe the present invention. It should be understood that the present invention is not limited by the numbers of the communication modules and the RF communication networks.

The communication modules 400 and 500 communicate RF signals of different frequency bands with the RF communication networks 11 and 12 and process them. As shown in FIG. 5, the communication modules 400 and 500 include antenna parts 410, 510, impedance matching parts 430, 530, and switching parts 420, 520, respectively.

The antenna parts 410, 510 include antenna patterns that correspond to frequency bands of corresponding RF communication networks, respectively. The impedance matching parts 430, 530 perform an impedance match of the antenna parts 410, 510, respectively.

As shown in FIG. 5, the impedance matching part 430, 530 include first matching units 431, 531 and second matching units 432, 532, correspondingly and respectively. The first matching units 431, 531 are coupled to the antenna parts 410, 510 and performs an impedance match, where the antenna parts 410, 510 transmit and receive RF signals in frequency bands of the plurality of RF communication networks 11 and 12 to/from the RF communication networks 11 and 12. The second matching units 432, 532 are formed separately from first matching units 431, 531. The first matching units 431, 531 are coupled to the antenna parts 410, 510 to perform an impedance match, respectively. The second matching units 432, 532 may be separately coupled to the antenna parts 410, 510 to skew the impedance of the antenna parts 410, 420. That is, the first matching units 431, 531 are used to perform RF communications with the RF communication networks, and the second matching units 432, 532 are employed to reduce interference among antennas. For example, while RF communication is performing via a particular antenna part, the second matching units 432, 532 of the other antenna part respectively skews the impedance of the first matching units 431, 531 to enhance the performance of the particular antenna part.

In an exemplary embodiment of the present invention, as shown in FIG. 5, the first communication module 400 includes matching unit A (431) as the first matching unit and matching unit B (432) as the second matching unit. Similarly, the second communication module 500 includes matching unit C (531) as the first matching unit and matching unit D (532) as the second matching unit. A person of ordinary skill in the art understand that the names "first" and "second" matching units could be reversed, however the functionality of one matching unit for transmission and the other for reducing interference remains the same.

The switching part 420 selectively connects the first matching units 431, 531 and the second matching units 432, 532 to the antenna parts 410, 510, respectively. The switching parts 420 and 520 selectively connect the first matching units 431, 531 and the second matching units 432, 532 to the antenna parts 410, 510, respectively. The switching parts 420 and 520 may further include switching units that are coupled to the first matching units 431, 531 and the second matching units 432, 532, respectively.

Still referring to FIG. 5, the controller 600 can control the communication modules 400 and 500 via a communication module corresponding to an RF communication network selected by a user so as to be coupled to the selected RF communication network.

In a second exemplary embodiment of the present invention, the controller 600 can perform a control operation such that a communication module corresponding to a selected RF communication network performs an impedance match with a frequency band of the selected RF communication network and the remaining communication modules, other that the communication module corresponding to the selected RF communication network, and does not perform an impedance match with frequency bands of respective corresponding RF communication networks.

The controller 600 drives the first matching units 431, 531 of the communication modules corresponding to a selected RF communication network so that the communication modules can perform an impedance match with a frequency band of the selected RF communication network. It is preferable that the controller 600 controls the switching parts 420, 520 of communication modules corresponding to a selected RF communication network, so that the first matching units 431, 531 of the communication modules corresponding to the selected RF communication network are coupled to the antenna parts 410, 510 of the communication modules, respectively, disconnects the second matching units 432, 532 of the communication modules, and performs an impedance match with the antenna parts 410, 510 of the communication modules.

The controller 600 can also selectively drive the combination of the first matching units 431, 531 and the second matching units 432, 532 of the remaining communication modules, other than a communication module corresponding to a selected RF communication network, so that the remaining communication modules do not perform an impedance match with frequency bands of respective corresponding RF communication networks.

It is preferable that the controller 600 controls the switching parts 420, 520 of remaining communication modules, other than a communication module corresponding to a selected RF communication network, to connect all of the first matching units 431 and 531 and the second matching units 432, 532 of the remaining communication modules to the antenna parts 410, 510 of the remaining communication modules, so as not to perform an impedance match with the antenna parts 410, 510 of the remaining communication modules. In addition, the controller 600 controls the switching parts 420, 520 of the remaining communication modules, other than a communication module corresponding to a selected RF communication module, to disconnect the first matching units 431, 531 of the remaining communication modules from the antenna parts 410, 510 of the remaining communication modules, so as not to perform an impedance match with the antenna parts 410, 510 of the remaining communication modules.

As shown in FIG. 5, in a second exemplary embodiment of the present invention, the multi-standby portable terminal 1 is illustrated, including two communication modules. That is, the first communication module 400 is coupled to the first RF communication network 11 and transmits and receives RF signals thereto and therefrom. Similarly, the second communication module 500 is coupled to the second RF communication network 12 and transmits and receives RF signals thereto and therefrom.

The first communication module 400 includes a first impedance matching part 430, having first matching unit A (431) and second matching unit B (432), and a first switching part 420 for selectively switching the first matching unit A (431) and the second matching unit B (432). The first matching unit A (431) performs an impedance match with the first antenna part 410 in order to transmit and receive RF signals to and from the first RF communication network 11. The second matching unit B (432) serves to skew the impedance of the first antenna part 410. The second communication module 500 includes a second impedance matching part 530, having first matching unit C (531) and second matching unit D (532), and a second switching part 520 for selectively switching the first matching unit C (531) and the first matching unit D (532). The first matching unit C (531) performs an impedance match with the second antenna part 510 in order to transmit and receive RF signals to and from the second RF communication network 12. The second matching unit D (532) serves to skew the impedance of the second antenna part 510.

The controller 600 can control the first switching part 420 and the second switching part 520 to perform an impedance match with the first antenna part 410 or the second antenna part 510.

As described above, the multi-standby portable terminal, according to the second exemplary embodiment of the present invention, selectively couples the first and second matching units to the antenna parts of the plurality of communication modules and performs an impedance match in order to optimize the performance of the antenna parts that are communicating.

In the following description, the operation of the multi-standby portable terminal, according to the second exemplary embodiment of the present invention, is described in detail with reference to the drawings.

FIG. 6A and FIG. 6B are schematic block diagrams illustrating operations when the multi-standby portable terminal of the second exemplary embodiment of the present invention accesses a first RF communication network.

As shown in FIGS. 6A and 6B, the multi-standby portable terminal 1 can communicate with the first RF communication network 11 as the controller 600 controls the first switching part 420 of the first communication module 400 so that the first switching part 420 closes the switching unit 421 coupled to the first matching unit A (431) and opens the switching unit 422 coupled to the second matching unit B (432).

The controller 600 can also control the second switching part 520 of the second communication module 500 to be selectively coupled to the matching unit C (531) or the matching unit D (532). As shown in FIG. 6A, when the switching part 520 closes the switching unit 521 coupled to the matching unit C (531), it can also close the switching unit 522 coupled to the matching unit D (532) in order to skew the impedance of the second antenna part 510. In addition, as shown in FIG. 6B, when the switching part 520 opens the switching unit 521 coupled to the matching unit C (531), it must close the switching unit 522 coupled to the matching unit D (532) because the second antenna part 510 must also remain in an idle mode.

As such, the controller 600 controls the switching part to be coupled to the matching unit A (431) of the first communication module 400 communicating with the first RF communication network 11 to perform an impedance match with the first antenna part 410 and thus optimizes the performance of the first antenna part 410. The controller 600 also controls the switching part to be selectively coupled to the matching unit C (531) or the matching unit D (532) of the second communication module 500 so as not to perform an impedance match with the second antenna part 510 and thereby skew the performance of the second antenna part 510. Therefore, the interference between the first antenna part 410 and the second antenna part 510 can be minimized. Accordingly, the first antenna part 410 communicating with the first RF communication network 11 can exert an optimal radiation performance.

FIG. 7 is a flow chart illustrating exemplary operations of the multi-standby portable terminal according to the second exemplary embodiment of the present invention.

When a user performs a selection of an RF communication network (601), the controller 600 determines whether a first RF communication network 11 or a second RF communication network 12 has been selected (602).

If the controller 600 ascertains that a first RF communication network 11 has been selected at 602, it controls the first switching part 420 of the first communication module 400 to be coupled to the matching unit A (431) to perform an impedance match with the first antenna part 410 and thus optimizes the performance of the first antenna part 410 (603). The controller 600 also controls the second switching part 520 of the second communication module 500 to be selectively coupled to the first matching unit C (531) or the second matching unit D (532) and thus skews the performance of the second antenna part 510 (604). After that, the controller 600 can communicate RF signals with the first RF communication network 11 via the first antenna part 410 of the first communication module 400 (605).

On the contrary, if the controller 600 ascertains that a second RF communication network 12 has been selected at 602, it controls the second switching part 520 of the second communication module 500 to be coupled to the matching unit C (531) to perform an impedance match with the second antenna part 510 and thus optimizes the performance of the second antenna part 510 (606). The controller 600 also controls the first switching part 420 of the first communication module 400 to be selectively coupled to the first matching unit A (431) or the second matching unit B (432) and thus skews the performance of the first antenna part 410 (607). After that, the controller 600 can communicate RF signals with the second RF communication network 12 via the second antenna part 510 of the second communication module 500 (608).

As described above, the multi-standby portable terminal, according to a second exemplary embodiment of the present invention, can switch impedance matching units coupled to the antenna parts, according to a frequency band of an RF communication network that is performing communication, thereby optimizing the performance of the antenna part that is performing communication.

As described above, the portable terminal, according to the present invention, can alter an antenna pattern according to the frequency band of an RF communication through with which it is currently communicating, thereby optimizing the antenna performance.

The portable terminal can also alter an impedance matching part coupled to the antenna part, according to the frequency band of an RF communication network through which it is currently communicating, thereby optimizing the antenna performance.

In the foregoing description, although the present invention is described based on the multi-standby portable terminal, it will be appreciated that the portable terminal can be applied to any type of: information communication devices, multimedia devices, and their applications, which have an antenna or antennas, such as, mobile communication terminals, mobile phones, personal digital assistants (PDAs), smart phones, international mobile telecommunication 2000 (IMT-2000) terminals, code division multiple access (CDMA) terminals, global system for mobile communication (GSM) terminals, universal mobile telecommunication service (UMTS) terminals, digital broadcasting terminals, etc., just to name a few non-limiting possibilities.

The antenna part of the multi-standby portable terminal according to the present invention includes but is not limited to built-in antennas, such as, microstrip patch antennas, micro-antennas, modified various built-in antennas, etc. Examples of the microstrip patch antenna are F type antennas, microstrip slot antennas, microstrip ring antennas, microstrip aperture array antennas, microstrip stripline antennas, etc. Examples of the micro-antennas are inverted F antennas, SMD antennas, MMIC antennas, etc. Also, why the examples disclose a user selection of the network, it is within the spirit of the invention and scope of the appended claims that the selection could be automatic based on a number of different criteria, including signal strength, available bandwidth, etc. just to name a few possibilities.

The terms or words described in the present description and the claims should not be limited by a general or lexical meaning, instead should be analyzed as a meaning and a concept through which the inventor defines and describes the present invention at his most effort, to comply with the idea of the present invention. Therefore, one skilled in the art will understand that the exemplary embodiments disclosed in the description and configurations illustrated in the drawings are only preferred exemplary embodiments, and instead there may be a great deal of various modifications, alterations, and equivalents thereof to replace the exemplary embodiments at the time of filing this application.

Although exemplary embodiments of the present invention have been described in detail hereinabove, it should be understood that many variations and modifications of the basic inventive concept herein described, which may be apparent to those skilled in the art, will still fall within the spirit and scope of the exemplary embodiments of the present invention as defined in the appended claims.

What is claimed is:

1. A multi-standby portable terminal that can be coupled to a plurality of radio frequency (RF) communication networks, comprising:
 a plurality of communication modules for transmitting and receiving RF signals of different frequency bands to and from the plurality of RF communication networks; and
 a controller for controlling the plurality of communication modules so as to be coupled to a selected RF communication network of the plurality of RF communication networks, via a communication module of said plurality of communication modules corresponding to the selected RF communication network, and for controlling a switching to a frequency band of the selected RF communication network;
 wherein the controller is configured to perform a control operation in which the communication module corresponding to the selected RF communication network radiates electromagnetic waves corresponding to a frequency band of the selected RF communication network, and a remainder of communication modules other than the communication module corresponding to the selected RF communication network radiates electromagnetic waves of frequency bands that differ from those of respective corresponding RF communication networks,
 wherein each of the plurality of communication modules comprises a first antenna pattern tuned for operation in the frequency bands for each of the communication modules and a second antenna pattern formed separately from the first antenna pattern to have frequency bands differing from the first antenna pattern, and
 wherein when the first antenna pattern of a first communication module corresponding to the selected RF communication network radiates electromagnetic waves to communicate with the selected RF communication network, the second antenna pattern of other communication module radiates electromagnetic waves in order to skew the electromagnetic waves of the first antenna pattern of other communication modules.

2. The multi-standby portable terminal of claim 1, wherein each of the plurality of communication modules comprises:
 a switching part for selectively switching on the first antenna pattern or the second antenna pattern.

3. The multi-standby portable terminal of claim 2, wherein the controller controls the switching part of the communication module corresponding to the selected RF communication network, drives the first antenna pattern of the communication module corresponding to the selected RF communication network, and stops driving the second antenna pattern of the communication module corresponding to the selected RF communication network to radiate electromagnetic waves of a frequency band that corresponds to that of the selected RF communication network.

4. The multi-standby portable terminal of claim 3, wherein the controller controls switching parts of said remainder of communication modules of said plurality of communication modules other than the communication module corresponding to the selected RF communication network, and drives all of the first and second antenna patterns of said remainder of communication modules to radiate electromagnetic waves whose frequency bands differ from those of RF communication networks corresponding to the respective remainder of communication modules.

5. A multi-standby portable terminal that can be coupled to a plurality of radio frequency (RF) communication networks, comprising:
 a plurality of communication modules for transmitting and receiving RF signals of different frequency bands to and from the plurality of RF communication networks; and
 a controller for controlling the plurality of communication modules so as to be coupled to a selected RF communication network of the plurality of RF communication networks, via a communication module of said plurality of communication modules corresponding to the selected RF communication network, and for controlling a switching to a frequency band of the selected RF communication network;
 wherein the controller performing a control operation in which the communication module corresponding to the selected RF communication network radiates electromagnetic waves corresponding to a frequency band of the selected RF communication network, and a remainder of communication modules other than the communication module corresponding to the selected RF communication network radiates electromagnetic waves of frequency bands that differ from those of respective corresponding RF communication networks, and
 wherein each of the plurality of communication modules comprises a first antenna part and a second antenna part, each one of said first antenna part and said second antenna part includes both a first antenna pattern tuned for operation in the frequency bands of the selected RF communication networks and a second antenna pattern formed separately from the first antenna pattern to have frequency bands differing from the first antenna pattern, and wherein when the first antenna pattern of a first communication module corresponding to the selected RF communication network radiates electromagnetic waves to communicate with the selected RF communication network, while the second antenna pattern of at least one second communication module of the remainder of the plurality of communication modules radiates electromagnetic waves the electromagnetic waves of the first antenna pattern of said second communication module of the remainder of communication modules when the first antenna pattern of the first communication module is communicating with the selected RF communication network,
 wherein each of the plurality of communication modules comprises:
 a switching part for selectively switching on the first antenna pattern or the second antenna pattern;
 wherein the controller controls the switching part of the communication module corresponding to the selected RF communication network, drives the first antenna pattern of the communication module corresponding to the selected RF communication network, and stops driving the second antenna pattern of the communication module corresponding to the selected RF communication network to radiate electromagnetic waves of a frequency band that corresponds to that of the selected RF communication network, and wherein the controller controls switching parts of said remainder of the plurality of communication modules other than the communication module corresponding to the selected RF communication network, and stops driving the first antenna pattern of said remainder of communication modules to radiate electromagnetic waves whose frequency bands differ from those of RF communication networks corresponding to the respective remainder of said communication modules.

6. The multi-standby portable terminal of claim 2, wherein the second antenna patterns are comprised of arbitrary patterns using frequency bands differing from those of the first antenna patterns of the plurality of communication modules.

* * * * *